(12) United States Patent
Uno et al.

(10) Patent No.: US 12,126,569 B2
(45) Date of Patent: Oct. 22, 2024

(54) INFORMATION COMMUNICATION DEVICE AND INFORMATION COMMUNICATION SYSTEM

(71) Applicant: SONY SEMICONDUCTOR SOLUTIONS CORPORATION, Kanagawa (JP)

(72) Inventors: Masahiro Uno, Kanagawa (JP); Osamu Kozakai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 329 days.

(21) Appl. No.: 17/613,133

(22) PCT Filed: May 25, 2020

(86) PCT No.: PCT/JP2020/020504
§ 371 (c)(1),
(2) Date: Nov. 22, 2021

(87) PCT Pub. No.: WO2020/241552
PCT Pub. Date: Dec. 3, 2020

(65) Prior Publication Data
US 2022/0216974 A1 Jul. 7, 2022

(30) Foreign Application Priority Data
May 31, 2019 (JP) .................. 2019-103043

(51) Int. Cl.
*H04L 5/00* (2006.01)
*H04B 7/06* (2006.01)
(Continued)

(52) U.S. Cl.
CPC ............. *H04L 5/0055* (2013.01); *H04B 7/06* (2013.01); *H04B 7/10* (2013.01); *H04W 16/28* (2013.01); *H04W 28/04* (2013.01)

(58) Field of Classification Search
CPC ........... H04L 5/0055; H04B 7/06; H04B 7/10; H04B 7/0623; H04B 7/0617; H04W 16/28; H04W 28/04; H04W 88/02
See application file for complete search history.

(56) References Cited

U.S. PATENT DOCUMENTS

| 2017/0141952 A1* | 5/2017 | Inohiza | ............... H04B 7/0608 |
| 2018/0248811 A1 | 8/2018 | Di Nallo et al. | |
| 2020/0059288 A1* | 2/2020 | Lopez | .................. H04B 7/0802 |

FOREIGN PATENT DOCUMENTS

| CN | 108512577 A | 9/2018 |
| JP | 2010-178068 A | 8/2010 |

(Continued)

OTHER PUBLICATIONS

International Search Report and Written Opinion of PCT Application No. PCT/JP2020/020504, issued on Aug. 18, 2020, 09 pages of ISRWO.

*Primary Examiner* — Eric Myers
(74) *Attorney, Agent, or Firm* — CHIP LAW GROUP (57) ABSTRACT

An information communication device includes a transmission unit that wirelessly transmits a signal including data to a communication partner device via a transmission antenna, a reception unit that receives, via a reception antenna, an Ack signal wirelessly transmitted from the communication partner device; and a control unit that changes an antenna characteristic control mode of the transmission antenna, based on a reception state of the Ack signal received by the reception unit.

10 Claims, 3 Drawing Sheets

(51) Int. Cl.
*H04B 7/10* (2017.01)
*H04W 16/28* (2009.01)
*H04W 28/04* (2009.01)

(56) References Cited

FOREIGN PATENT DOCUMENTS

| | | |
|---|---|---|
| JP | 2017-092911 A | 5/2017 |
| JP | 2018-157559 A | 10/2018 |
| KR | 10-2018-0099538 A | 9/2018 |

* cited by examiner

FIG.1

INFORMATION COMMUNICATION DEVICE AND INFORMATION COMMUNICATION SYSTEM

CROSS REFERENCE TO RELATED APPLICATIONS

This application is a U.S. National Phase of International Patent Application No. PCT/JP2020/020504 filed on May 25, 2020, which claims priority benefit of Japanese Patent Application No. JP 2019-103043 filed in the Japan Patent Office on May 31, 2019. Each of the above-referenced applications is hereby incorporated herein by reference in its entirety.

FIELD

The present disclosure relates to an information communication device and an information communication system.

BACKGROUND

In an Internet on Things (IoT), for wireless terminal devices each of which is mounted with a single wireless circuit, an omnidirectional antenna has been adopted.

For example, in the IoT for a cellular system, the wireless terminal device performs wireless communication with a base station device. In general, a direction from the wireless terminal device to the base station device is referred to as uplink, and a direction from the base station device to the wireless communication device is referred to as downlink.

The wireless terminal device wirelessly transmits an uplink data signal to the base station device. The base station device receives the uplink data signal, determines whether the uplink data signal is correctly received, by using a determination circuit, and wirelessly transmits an Ack or Nack signal to the wireless terminal device according to a result of the determination. Here, the Ack signal indicates that the uplink data signal is normally received, and the Nack signal indicates that the uplink data signal is not normally received.

When receiving the Ack signal from the base station device, the wireless terminal device wirelessly transmits a next uplink data signal to the base station device. On the other hand, when receiving the Nack signal from the base station device, or when receiving neither the Ack signal nor the Nack signal from the base station device, the wireless terminal device retransmits the uplink data signal including the same data to the base station device.

In the communication device described in Patent Literature 1, when it is determined that data is not correctly transmitted by a certain antenna beam, the antenna beam is changed to select a different propagation path, and the data is retransmitted (see Patent Literature 1). The technology described in Patent Literature 1 is particularly used for transmission of streaming data such as video data. For continuous data transmission such as the video data, the communication quality can be further improved by controlling the directivity during transmission.

CITATION LIST

Patent Literature

Patent Literature 1: JP 2017-92911 A

SUMMARY

Technical Problem

However, in a wireless terminal device for the IoT of such a technology as described in Patent Literature 1, the number of times of adjustment of the antenna beam increases, and power consumption increases in some cases. Furthermore, such a situation may occur in an information communication device other than that for the IoT.

The present disclosure has been made in view of such circumstances, and an object of the present disclosure is to provide an information communication device and an information communication system that are operable to ensure the quality of data transmission to a communication partner device while suppressing power consumption.

Solution to Problem

One aspect of the present disclosure corresponds to the information communication device that includes: a transmission unit that wirelessly transmits a signal including data to a communication partner device via a transmission antenna; a reception unit that receives, via a reception antenna, an Ack signal wirelessly transmitted from the communication partner device; and a control unit that changes an antenna characteristic control mode of the transmission antenna, based on a reception state of the Ack signal received by the reception unit.

One aspect of the present disclosure corresponds to the information communication device wherein the control unit retransmits the signal including the data by the transmission unit, in a case where the Ack signal is not received by the reception unit when the transmission unit wirelessly transmits the signal to the communication partner device via the transmission antenna, and the control unit changes the antenna characteristic control mode of the transmission antenna, based on the number of times of transmission of the signal including the data, performed by the reception unit before the Ack signal is received.

One aspect of the present disclosure corresponds to the information communication device that further includes a memory that stores the antenna characteristic control mode, wherein the control unit performs processing of causing the memory to store the antenna characteristic control mode and processing of reading and using the antenna characteristic control mode stored in the memory.

One aspect of the present disclosure corresponds to the information communication device that further includes a sensor that detects a value representing a change in environment, wherein the control unit changes the antenna characteristic control mode of the transmission antenna, based on the value detected by the sensor.

One aspect of the present disclosure corresponds to the information communication device wherein the control unit changes the antenna characteristic control mode of the transmission antenna, when the value detected by the sensor satisfies a predetermined condition.

One aspect of the present disclosure corresponds to the information communication device wherein at least some of circuits are switched between a sleep state and an activation state, and the value is detected by the sensor at timing at which the at least some of circuits are switched from the sleep state to the activation state.

One aspect of the present disclosure corresponds to the information communication device wherein at least some of circuits are switched between a sleep state and activation state, and when the value detected by the sensor satisfies a predetermined condition, while the at least some of circuits are in the sleep state, the at least some of circuits switch from the sleep state to the activation state.

One aspect of the present disclosure corresponds to the information communication device wherein the antenna characteristic control mode of the transmission antenna represents one antenna characteristic to be set.

One aspect of the present disclosure corresponds to the information communication device wherein the antenna characteristic control mode of the transmission antenna represents a plurality of different antenna characteristics.

One aspect of the present disclosure corresponds to the information communication device according wherein the control unit performs switching to use all of the plurality of the antenna characteristics represented by the antenna characteristic control mode of the transmission antenna.

One aspect of the present disclosure corresponds to the information communication device wherein the control unit performs switching to use some of the plurality of the antenna characteristics represented by the antenna characteristic control mode of the transmission antenna.

One aspect of the present disclosure corresponds to the information communication device wherein the control unit switches the antenna characteristics of the transmission antenna when the Ack signal is not received by the reception unit.

One aspect of the present disclosure corresponds to the information communication device wherein the antenna characteristic control mode of the transmission antenna includes an order of switching two or more different antenna characteristics.

One aspect of the present disclosure corresponds to the information communication device wherein the transmission antenna and the reception antenna share an antenna.

One aspect of the present disclosure corresponds to the information communication system that includes a first information communication device and a second information communication device, wherein the first information communication device includes: a transmission unit that wirelessly transmits a signal including data to the second information communication device by a transmission antenna; a reception unit that receives an Ack signal wirelessly transmitted from the second information communication device by a reception antenna; and a control unit that changes an antenna characteristic control mode of the transmission antenna based on a reception state of the Ack signal received by the reception unit, and wherein the second information communication device includes: a communication unit that receives the signal wirelessly transmitted from the first information communication device and wirelessly transmits the Ack signal for the received signal to the first information communication device.

DESCRIPTION OF EMBODIMENTS

Hereinafter, embodiments will be described with reference to the drawings.

[Overview of Configuration of Information Communication System]

Figure 1:
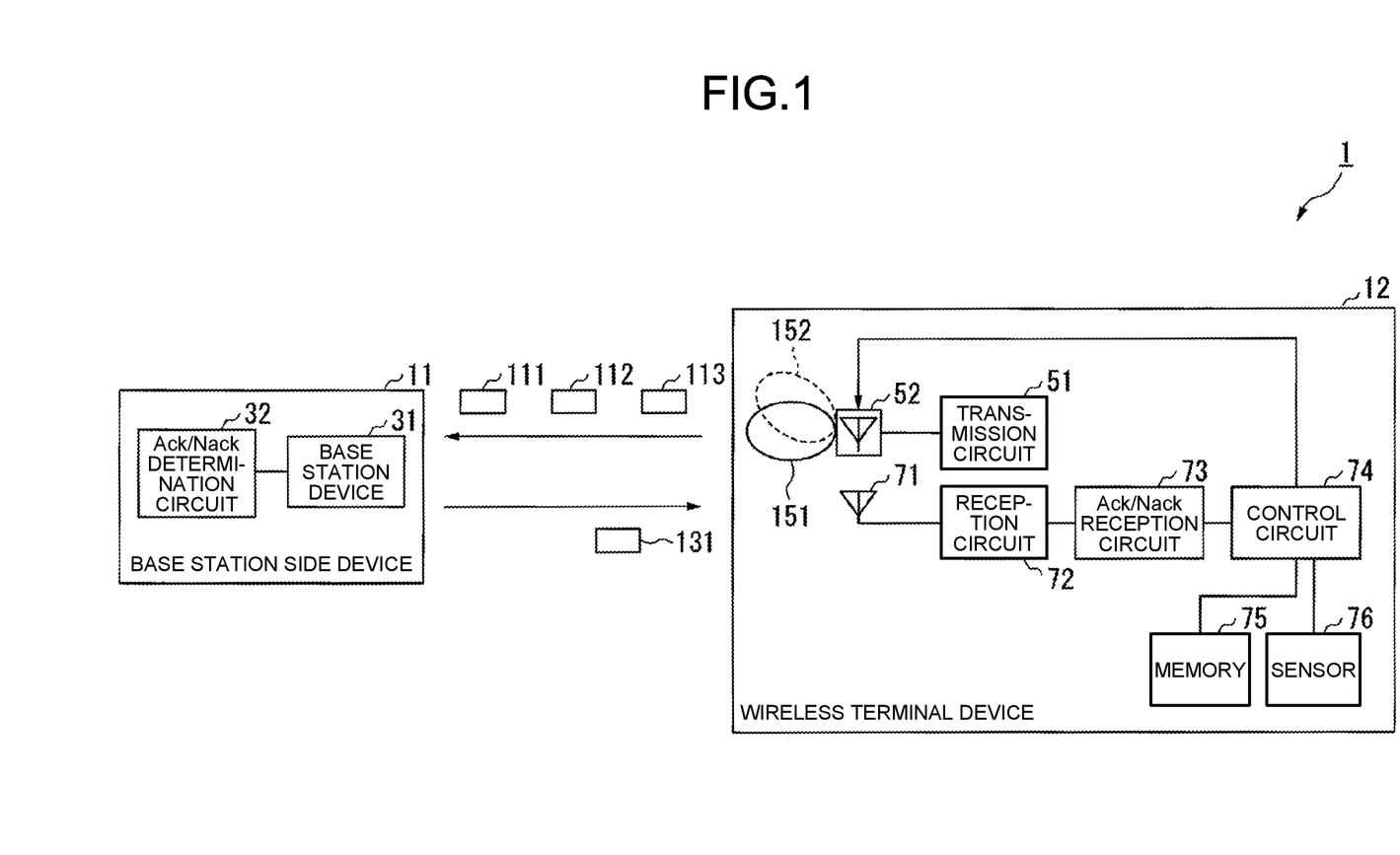
FIG. 1 is a diagram illustrating a schematic configuration of an information communication system according to an embodiment of the present disclosure.

FIG. 1 is a diagram illustrating a schematic configuration of an information communication system 1 according to an embodiment of the present disclosure.

The information communication system 1 includes a base station side device 11 and a wireless terminal device 12.

In the present embodiment, the wireless terminal device 12 is an example of an information communication device, and is an example of a first information communication device.

In the present embodiment, the base station side device 11 and the wireless terminal device 12 are IoT devices.

As the IoT, for example, IoT (CIoT) for a cellular system may be used. In one example, the cellular system is a system standardized in Third Generation Partnership PROGRAM (3GPP), and is a system widely used for mobile phones in the world. In particular, in the present embodiment, the IoT for the cellular system that adopts Category M1 or NB-IoT standardized in LTE Release 13 is assumed and described.

The base station side device 11 includes a base station device 31 and an Ack/Nack determination circuit 32. Note that in the present embodiment, the base station device 31 and the Ack/Nack determination circuit 32 are illustrated separately but may be integrally configured with each other. In this configuration, the base station side device 11 in the present embodiment may be referred to as the base station device.

In the present embodiment, the base station side device 11 is an example of a communication partner device with respect to the wireless terminal device 12, and is an example of a second information communication device. Furthermore, in the present embodiment, the base station device 31 is an example of a communication unit.

The wireless terminal device 12 includes a transmission circuit 51, a transmission antenna 52, a reception antenna 71, a reception circuit 72, an Ack/Nack reception circuit 73, a control circuit 74, a memory 75, and a sensor unit 76.

In the present embodiment, the transmission circuit 51 is an example of a transmission unit, the reception circuit 72 is an example of a reception unit, and the control circuit 74 is an example of a control unit.

For the transmission antenna 52, an antenna that has a changeable antenna characteristic in transmission is used. Here, the antenna characteristic may be referred to as, for example, antenna directivity or an antenna radiation characteristic.

Note that although two antenna characteristics 151 and 152 are schematically illustrated in FIG. 1, the number of the antenna characteristics implemented by the transmission antenna 52 may be any number or may be three or more.

Furthermore, the transmission antenna 52 and the reception antenna 71 may be, for example, independent antennas or may be a common antenna shared between transmission and reception. When the common antenna shared between transmission and reception is used, the antenna may be controlled to have different antenna characteristics between the transmission and reception.

The sensor unit 76 includes one or more sensors that detect values representing a change in surrounding environment.

The control circuit 74 controls each unit in the wireless terminal device 12.

In addition, the wireless terminal device 12 includes, for example, a battery (illustration is omitted), and operates using the power of the battery. In this configuration, in order to make the battery last, it is particularly important to reduce power consumption.

[Outline of Processing in Information Communication System]

Processing performed in the wireless terminal device 12 and the base station side device 11 will be described.

In the wireless terminal device 12, the transmission circuit 51 wirelessly transmits an uplink data signal that is a signal including uplink data, to the base station device 31 via the transmission antenna 52. Therefore, the uplink data signal is transmitted from the wireless terminal device 12 to the base station device 31 at an uplink frequency. Note that FIG. 1 schematically illustrates the uplink data signals 111 to 113.

In this configuration, in the wireless terminal device 12, the control circuit 74 adaptively controls the antenna characteristic of the transmission antenna 52 so that uplink communication has a suitable propagation characteristic. For example, the control circuit 74 changes a control mode of the transmission antenna 52 so that the transmission antenna 52 is controlled to have the antenna characteristic based on the changed control mode.

Here, as the uplink data transmitted from the wireless terminal device 12 to the base station side device 11, any data may be used, and for example, data to be collected and managed on the side of the base station side device 11 may be used. Specifically, in a case where the wireless terminal device 12 is applied to a smart meter, data indicating a value measured by the smart meter may be used as the uplink data, or in a case where the wireless terminal device 12 is applied to a medical device, data indicating a value measured by the medical device may be used as the uplink data, and the same applies to others.

The base station device 31 receives the uplink data signal transmitted from the wireless terminal device 12. Then, the base station device 31 outputs the uplink data signal received from the wireless terminal device 12 to the Ack/hack determination circuit 32.

The Ack/Nack determination circuit 32 determines whether the uplink data signal input from the base station device 31 is normally received. Then, when it is determined that the uplink data signal is normally received, the Ack/Nack determination circuit 32 outputs an Ack signal to the base station device 31. On the other hand, when it is determined that the uplink data signal is not normally received, the Ack/Nack determination circuit 32 outputs a Nack signal to the base station device 31.

When the Ack signal is input from the Ack/Nack determination circuit 32, the base station device 31 wirelessly transmits the Ack signal to the wireless terminal device 12. On the other hand, when the Nack signal is input from the Ack/Nack determination circuit 32, the base station device 31 wirelessly transmits the Nack signal to the wireless terminal device 12.

Therefore, the AcK signal or the Nack signal (for convenience of description, both signals are also collectively referred to as an Ack/Nack signal) is transmitted as a downlink signal at a downlink frequency, from the base station device 31 to the wireless terminal device 12. Note that FIG. 1 schematically illustrates an Ack/Nack signal 131 as the downlink signal.

In the wireless terminal device 12, the Ack signal or the Nack signal transmitted from the base station device 31 is received by the reception antenna 71.

Here, in the present embodiment, the base station device 31 wirelessly transmits a predetermined notification signal constantly. Then, in the wireless terminal device 12, the reception circuit 72 receives the notification signal by the reception antenna 71 and detects the reception intensity of the notification signal. In the wireless terminal device 12, the control circuit 74 may adaptively control an antenna characteristic of the reception antenna 71 as necessary on the basis of the reception intensity. Note that in the wireless terminal device 12, the antenna characteristic of the reception antenna 71 may be controlled appropriately, and a detailed description thereof will be omitted in the present embodiment.

In the wireless terminal device 12, the reception circuit 72 performs predetermined processing on the Ack signal or Nack signal received by the reception antenna 71, and outputs the processed signal to the Ack/Nack reception circuit 73. For the predetermined processing, any processing, for example, processing upon receiving a general signal, such as processing of amplifying a signal, may be used.

In the wireless terminal device 12, the Ack/Nack reception circuit 73 determines whether the signal input from the reception circuit 72 is the Ack signal or the Nack signal. Then, the Ack/Nack reception circuit 73 outputs information indicating a result of the determination to the control circuit 74.

In the wireless terminal device 12, the control circuit 74 determines whether the Ack signal is received from the base station device 31 for the transmitted uplink data signal or the Nack signal is received from the base station device 31 for the transmitted uplink data signal, on the basis of the information input from the Ack/Nack reception circuit 73.

Then, in the wireless terminal device 12, when it is determined that the Ack signal is received from the base station device 31 for a certain uplink data signal, the control circuit 74 determines that the uplink data signal is normally received by the base station device 31 and performs management. On the other hand, when it is determined that the Nack signal is transmitted from the base station device 31 for a certain uplink data signal, the control circuit 74 controls the transmission circuit 51 to retransmit the uplink data signal to the base station device 31.

In the wireless terminal device 12, the control circuit 74 sets the antenna characteristic of the transmission antenna 52, on the basis of, for example, a situation in which the Ack signal is received from the base station device 31. In one example, in a case where data is transmitted and retransmitted to the base station device 31, the control circuit 74 may determine the antenna characteristic depending on whether how many times the data is transmitted, in which the Ack signal is received from the base station device 31.

Note that in the present embodiment, when no uplink data signal wirelessly transmitted from the wireless terminal device 12 reaches the base station device 31, the wireless terminal device 12 receives neither the Ack signal nor the Nack signal from the base station device 31. In this configuration, in the wireless terminal device 12, when the Ack signal or the Nack signal is not received from the base station device 31 even after a predetermined time has elapsed after a certain uplink data signal is wirelessly transmitted to the base station device 31, the control circuit 74 may control the transmission circuit 51 to retransmit the uplink data signal, as timeout, to the base station device 31.

In the present embodiment, in the wireless terminal device 12, a predetermined circuit has an activation state and a sleep state. In the present embodiment, for convenience of description, the predetermined circuit will be referred to as a sleep target circuit.

Here, the activation state of the sleep target circuit is a state in which the sleep target circuit is activated, and is a state in which processing of a predetermined function can be performed in the activation state of the sleep target circuit. In addition, the sleep state of the sleep target circuit is a state in which the sleep target circuit has a lower power consumption than that in the activation state and it is possible to perform processing of a predetermined function in the sleep state of the sleep target circuit.

The processing of the predetermined function in the activation state is partially or wholly different from the processing of the predetermined function in the sleep state. For example, the processing of the predetermined function in the sleep state is processing requiring lower power consumption than that of the processing of the predetermined function in the activation state.

For example, the sleep target circuit may transition to the activation state when it is necessary to perform processing of the predetermined function in the activation state, otherwise transition to the sleep state, and intermittent operation of these states may be performed.

Here, in the present embodiment, switching between the sleep state and the activation state of the control circuit 74 and the like will be described, as the sleep state in the wireless terminal device 12, but any circuit may be employed for the circuit in which the sleep state and the activation state are switchable.

The sleep target circuit, for example, may include only the control circuit 74, or the control circuit 74 and another predetermined circuit. In another configuration example, the control circuit 74 may not be brought into the sleep state but only the another predetermined circuit may be brought into the sleep state. For the another predetermined circuit, a wireless circuit or the like may be used.

In the present embodiment, the sleep target circuit includes at least the control circuit 74, and may further include a portion of another circuit related to wireless communication.

In the wireless terminal device 12, the control circuit 74 is configured to write and store various types of information in the memory 75 or read various types of information stored in the memory 75.

In the present embodiment, the control circuit 74 performs processing of writing and storing information for setting the antenna characteristic (for convenience of description, referred to as antenna characteristic setting information) in the memory 75 and processing of reading the antenna characteristic setting information stored in the memory 75.

In the present embodiment, the antenna characteristic setting information is an example of an antenna characteristic control mode.

Here, the antenna characteristic setting information may be, for example, information identifying one antenna characteristic to be set, or may be information identifying a plurality of different antenna characteristics to be searched in order to search for one antenna characteristic to be set.

In the wireless terminal device 12, the sensor unit 76 includes one or more sensors. The respective sensors detect various values. Then, each of the sensors outputs information of a detected value (for convenience of description, referred to as sensor detection value information) to the control circuit 74. In the present embodiment, the sensor detection value information is information indicating a change in the environment around the wireless terminal device 12 and is, for example, information enabling estimation of the change in the environment.

Here, in the wireless terminal device 12, for example, the control circuit 74 may cause the memory 75 to store the antenna characteristic setting information upon transition from the activation state to the sleep state, and then may read and use the antenna characteristic setting information, upon transition from the sleep state to the activation state.

Furthermore, in the wireless terminal device 12, the control circuit 74 may change the antenna characteristic setting information as necessary, on the basis of the sensor detection value information input from a predetermined sensor of the sensor unit 76, when a predetermined condition is satisfied. The predetermined sensor may be one sensor or two or more sensors. The predetermined condition may include a condition that the control circuit 74 has transitioned from the sleep state to the activation state, for example. Note that the control circuit 74 does not need to change the antenna characteristic setting information, when it is determined that the antenna characteristic setting information does not need to be changed, on the basis of the sensor detection value information, even if the predetermined condition is satisfied.

[Method of Setting Antenna Characteristic]

In the present embodiment, the number of antenna characteristics set included in the antenna characteristic setting information stored in the memory 75 is one or more. A setting value or evaluation index of an antenna may be stored in the memory 75, for each setting of one antenna characteristic. The evaluation index may be, for example, the number of times of retransmission, or may be comprehensively determined by the control circuit 74 or the like, including a signal quality of the downlink signal in addition to the number of times of retransmission.

Here, as the signal quality of the downlink signal, for example, a value of one of a received signal strenth indicator (RSSI), reference signal received quality (RSRQ), reference signal received power (RSRP), and signal interference noise ratio (SINR), values of any two or more thereof, or all the values thereof may be used. These signal qualities may be detected, for example, by the reception circuit 72 or the like, in the wireless terminal device 12.

When the number of antenna characteristics set included in the antenna characteristic setting information stored in the memory 75 is one, the control circuit 74 uses this one antenna characteristic to perform control to transmit the uplink data signal to the base station device 31. This one antenna characteristic is, for example, an antenna characteristic that has been suitable in the previous transmission of the uplink data signal.

When the number of antenna characteristics set, included in the antenna characteristic setting information stored in the memory 75 is two or more, the control circuit 74 uses a procedure for switching the plurality of antenna characteristics in a predetermined order to transmit the uplink data signal to the base station device 31, and searches for an antenna characteristic suitable for transmission and retransmission of the uplink data signal.

Here, the predetermined order is defined in the antenna characteristic setting information. For example, when the plurality of antenna characteristics is stored in the memory 75 in order, the predetermined order may be the same order as the order.

Any order may be used as the order of switching the plurality of antenna characteristics. The order may be, for example, an ascending order of the number of times of retransmission that is required until the transmission succeeds in the past, may be the same as the order when the plurality of antenna characteristics is previously switched, or may be a random order.

Note that in the wireless terminal device 12, the less the number of times of retransmission, the less the power consumption, normally.

Specifically, the control circuit 74 attempts to transmit the uplink data signal by setting the first antenna characteristic to the transmission antenna 52 first, on the basis of the antenna characteristic setting information, and when this transmission fails, the control circuit 74 attempts to transmit (here, retransmit) the uplink data signal by setting the second antenna characteristic to the transmission antenna 52. In this way, the plurality of antenna characteristics is switched in the predetermined order for attempt of transmission of the uplink data signal. Here, the second and subsequent transmission represents retransmission of the same data.

Furthermore, in such an attempt, in the wireless terminal device 12, the control circuit 74 may repeat the switching of the antenna characteristics and retransmission, for example, until the Ack signal is received from the base station device 31.

In one example, in the wireless terminal device 12, when the Ack signal is received from the base station device 31 at a desired predetermined number of times of retransmission or less, the control circuit 74 may stop the retransmission at that time. In this configuration, in the wireless terminal device 12, when all of the plurality of antenna characteristics based on the antenna characteristic setting information cannot be switched, transmission qualities of some top antenna characteristics of the plurality of antenna characteristics are confirmed, and as a result, the control circuit 74 is allowed to identify a suitable antenna characteristic although it is unclear whether the antenna characteristic is optimal.

In another example, in the wireless terminal device 12, even if the Ack signal is received from the base station device 31 in an antenna characteristic in the middle of attempt of transmission (including retransmission) by switching the plurality of antenna characteristics based on the antenna characteristic setting information in the predetermined order, the control circuit 74 may ignore the Ack signal and perform retransmission while continuing to switch the antenna characteristics for all of the antenna characteristics, in the subsequent order. In this configuration, in the wireless terminal device 12, transmission of the uplink data signal is attempted for all of the plurality of antenna characteristics based on the antenna characteristic setting information, confirming the transmission quality. In this configuration, in the wireless terminal device 12, the control circuit 74 is allowed to identify the optimal antenna characteristic from among the plurality of antenna characteristics based on the antenna characteristic setting information. Note that the optimal antenna characteristics may be narrowed down to, for example, one antenna characteristic in some cases, or two or more different antenna characteristics may be identified as equally optimal in some cases.

Furthermore, in the present embodiment, the control circuit 74 determines that a propagation environment is changing when the value detected by a sensor of the sensor unit 76 exceeds a predetermined threshold (an example of a first threshold). Note that processing of determining that the propagation environment is changing when the value detected by the sensor is less than the predetermined threshold may be used, instead of the processing of determining that the propagation environment is changing when the value detected by the sensor exceeds the predetermined threshold.

In the wireless terminal device 12, when it is determined that the propagation environment has changed on the basis of the sensor detection value information, the control circuit 74, for example, as in a case where there is no change in the propagation environment, may transmit the uplink data signal to the base station device 31 on the basis of the antenna characteristic setting information stored in the memory or may determine the antenna characteristic in another mode. The another mode, for example, may be determined in advance, and in one example, a mode may be used in which the antenna characteristic is determined at random. In such a configuration, in the wireless terminal device 12, the control circuit 74 may change the antenna characteristic setting information stored in the memory 75.

Note that in the wireless terminal device 12, for example, when changing the antenna characteristic setting information stored in the memory 75, the control circuit 74 may partially change the antenna characteristic setting information, or may generate new antenna characteristic setting information independently of the antenna characteristic setting information.

[Process Performed at Time of Sleep and Wake-Up, in Wireless Terminal Device]

Figure 2:
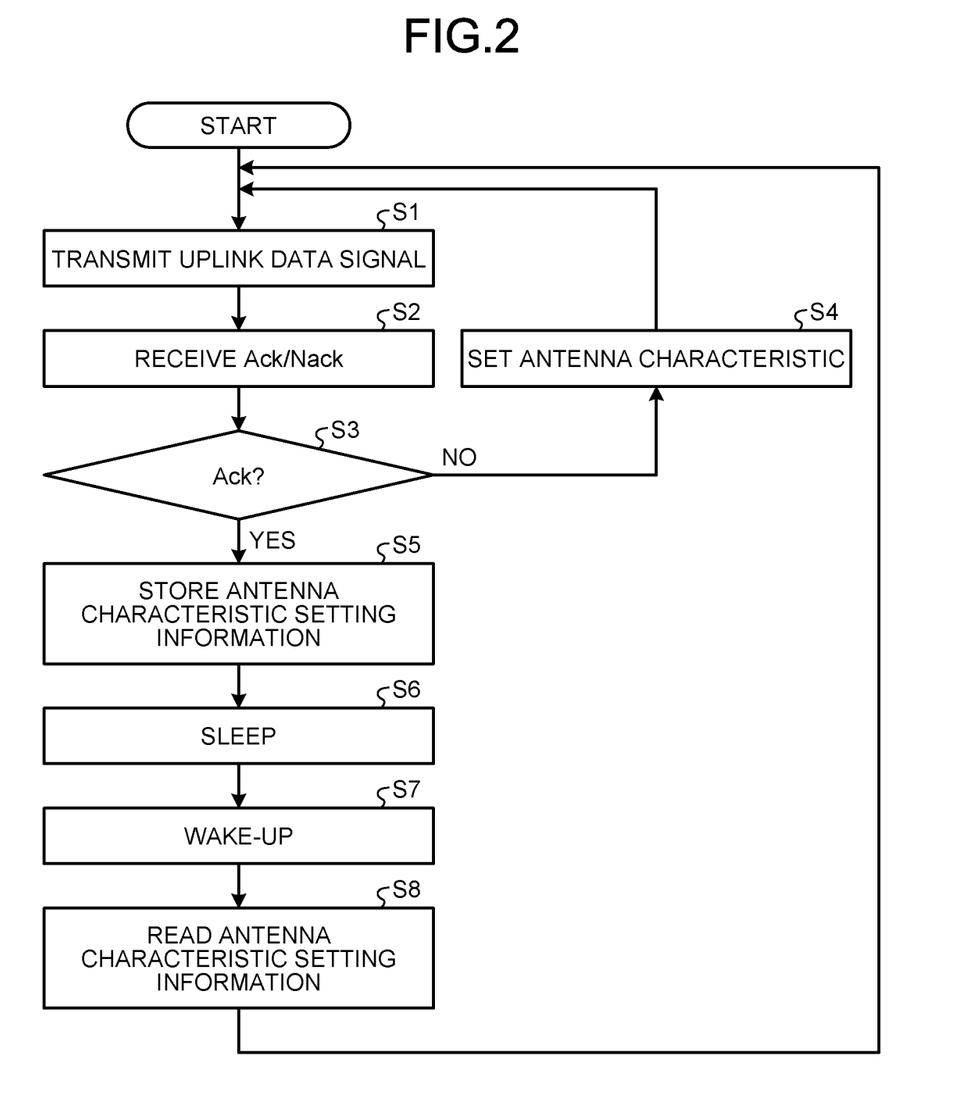
FIG. 2 is a flowchart illustrating an example of a process performed at the time of sleep and at the time of wake-up, in a wireless terminal device according to the embodiment of the present disclosure.

FIG. 2 is a flowchart illustrating an example of a process performed at the time of sleep and at the time of wake-up, in the wireless terminal device 12 according to the embodiment of the present disclosure.

In the present example, it is described that, in the wireless terminal device 12, every time the control circuit 74 transitions from the sleep state to the activation state, the control circuit 74 attempts to transmit the uplink data signal to the base station device 31 and returns to the sleep state again, in a repeated manner.

In the present process, first, the control circuit 74 is in the activation state.

(Step S1) The transmission circuit 51 wirelessly transmits the uplink data signal to the base station device 31 via the transmission antenna 52, for example, at the initial timing or at the time of wake-up. At this time, the transmission circuit 51 and the transmission antenna 52 are controlled by the control circuit 74. Then, the process proceeds to Step S2.

(Step S2) The reception circuit 72 receives, by the reception antenna 71, the Ack signal or the Nack signal wirelessly transmitted from the base station device 31 to the wireless terminal device 12. Then, the process proceeds to Step S3.

(Step S3) The Ack/Nack reception circuit 73 determines whether the Ack signal is received, on the basis of the signal received by the reception circuit 72. As a result, when the Ack/Nack reception circuit 73 determines that no Ack signal is received, the control circuit 74 proceeds to Step S4. On the other hand, when the Ack/Nack reception circuit 73 determines that the Ack signal is received, the control circuit 74 proceeds to Step S5.

(Step S4) When no Ack signal is received, the control circuit 74 sets the antenna characteristic to a predetermined content. Then, the process proceeds to Step S1. In this case, in Step S1, the second and subsequent transmission of the uplink data signal is retransmission.

Here, the predetermined content is, for example, an antenna characteristic different from the antenna characteristic being set at that point. In other words, when no Ack signal is received, the control circuit 74 changes the antenna characteristic to another content. The method of changing the antenna characteristic, for example, may be determined in advance. The method may include, for example, an order of changing the plurality of antenna characteristics.

In the present embodiment, the method is based on the antenna characteristic setting information. For example, in a case where the antenna characteristic setting information defines switching the plurality of different antenna characteristics, the control circuit 74 may switch the plurality of different antenna characteristics in the predetermined order in Step S4. Furthermore, for example, in a case where the antenna characteristic setting information defines one antenna characteristic, the control circuit 74 may perform switching to another antenna characteristic in a predetermined manner or at random, in Step S4.

Note that, in another example, the same antenna characteristic may be continuously used twice or more in Step S4. In other words, in Step S4, the antenna characteristic may not be changed, and the same antenna characteristic as that in the previous transmission may be used for retransmission in which the uplink data signal is transmitted a plurality of times.

(Step S5) When the Ack signal is received, the control circuit 74 causes the memory 75 to store the antenna characteristic setting information based on the antenna characteristic at that point. Then, the process proceeds to Step S6.

Here, the antenna characteristic setting information is, for example, information indicating use of the antenna characteristic at least when the Ack signal is received. In one example, the antenna characteristic setting information may be information indicating use of one antenna characteristic when the Ack signal is received. In another example, the antenna characteristic setting information may be information indicating that the one antenna characteristic when the Ack signal is received is defined as the first antenna characteristic and the second and subsequent other antenna characteristics are switched in the predetermined order.

(Step S6) The control circuit 74 transitions from the activation state to the sleep state. Then, the process proceeds to Step S7.

(Step S7) Then, when the predetermined condition is satisfied, the control circuit 74 wakes up and transitions from the sleep state to the activation state. Then, the process proceeds to Step S8. The predetermined condition may be any condition, and for example, a condition that a predetermined time has elapsed, a condition that a predetermined event has occurred, or the like may be used. The occurrence of the predetermined event may be determined on the basis of, for example, the sensor detection value information detected by the sensor.

(Step S8) The control circuit 74 reads the antenna characteristic setting information stored in the memory 75, and sets the antenna characteristic of the transmission antenna 52 according to the antenna characteristic setting information. Then, the process proceeds to Step S1. In this case, in Step S1, transmission of the uplink data signal represents transmission of a new uplink data signal.

In one example, when the antenna characteristic setting information is the information identifying one antenna characteristic to be set, the control circuit 74 sets the antenna characteristic to the transmission antenna 52.

In another example, when the antenna characteristic setting information is the information identifying a plurality of different antenna characteristics to be searched in order to search for one antenna characteristic to be set, the control circuit 74 first switches the antenna characteristic of the transmission antenna 52 to one antenna characteristic of the plurality of antenna characteristics to be searched for. Here, a search order for searching the plurality of antenna characteristics to be searched, may have been determined.

Note that, in the present embodiment, a different search order represents different antenna characteristic setting information, even if the plurality of antenna characteristics to be searched is the same as a whole.

Here, the example of FIG. 2 shows that the Ack signal is always received at any of stages whenever Step S3 is repeated in the wireless terminal device 12. However, in another example, in a case where no Ack signal is continuously received a predetermined number of times even when Step S3 is repeated, the process may once proceed to Step S6 or the like.

[Process Performed Based on Sensor Detection Value Information in Wireless Terminal Device]

Figure 3:
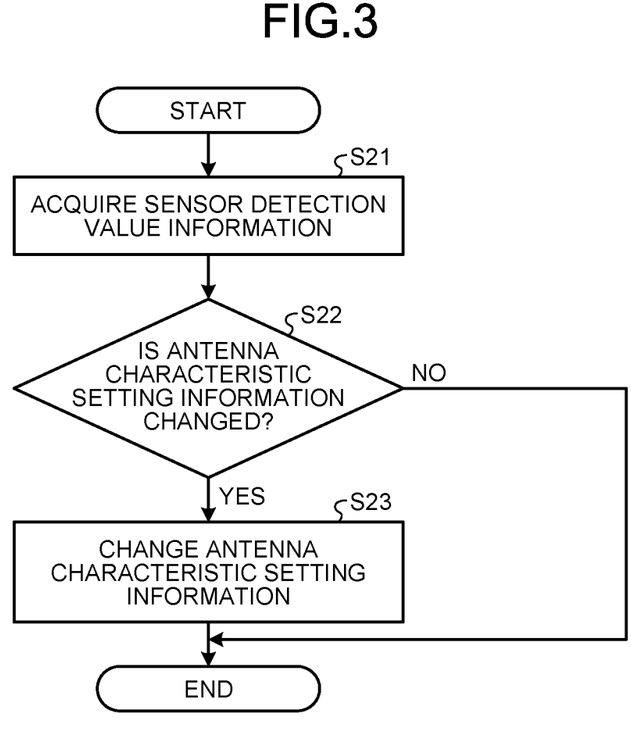
FIG. 3 is a flowchart illustrating an example of a process performed on the basis of sensor detection value information, in the wireless terminal device according to the embodiment of the present disclosure.

FIG. 3 is a flowchart illustrating an example of a process performed on the basis of the sensor detection value information, in the wireless terminal device 12 according to the embodiment of the present disclosure.

The process illustrated in FIG. 3 is performed when the predetermined condition is satisfied in the wireless terminal device 12. The predetermined condition may be any condition, for example, a condition that a predetermined time has elapsed or a condition that the control circuit 74 has transitioned from the sleep state to the activation state.

(Step S21) The control circuit 74 acquires the sensor detection value information from the sensor of the sensor unit 76. Then, the control circuit 74 proceeds to Step S22.

Here, the sensor detection value information may be, for example, the sensor detection value information from one sensor or a combination of the sensor detection value information from two or more sensors.

(Step S22) On the basis of the acquired sensor detection value information, the control circuit 74 determines whether to change the antenna characteristic setting information at that point. As a result, when determining to change the antenna characteristic setting information, the control circuit 74 proceeds to Step S23. On the other hand, when determining not to change the antenna characteristic setting information, the control circuit 74 finishes this process.

(Step S23) The control circuit 74 changes the antenna characteristic setting information. Then, the control circuit 74 finishes the present process.

Here, as a method of determining whether to change the antenna characteristic setting information on the basis of the sensor detection value information, any method may be used. For example, when it is considered that the environment of the wireless communication performed by the wireless terminal device 12 has changed, a method of determining to change the antenna characteristic setting information is used.

Furthermore, as a method of changing the antenna characteristic setting information, any method may be used. For example, a method of determining the antenna characteristic setting information after changing, on the basis of the sensor detection value information may be used.

Note that in the present embodiment, the wireless terminal device 12 enables such as new determination of or change of the antenna characteristic setting information, on the basis of the sensor detection value information detected by the sensor, but the wireless terminal device 12 may have a configuration not using the sensor detection value information, as another configuration example. In this configuration, the wireless terminal device 12 may not include the sensor unit 76.

The wireless terminal device 12 according to the present embodiment will be described in more detail below.

[Specific Example of Transmission Antenna]

As the transmission antenna 52, various antennas may be used.

For example, an antenna configured to change the antenna characteristics by changing a feeding point may be used, as the transmission antenna 52.

For example, an antenna configured to change the antenna characteristics by changing a short-circuit point may be used, as the transmission antenna 52.

For example, an antenna configured to change the antenna characteristics by switching parasitic elements (changing impedance changes the direction of the beam) may be used, as the transmission antenna 52.

For example, an antenna configured to change the antenna characteristics by switching a plurality of aligned antennas (e.g., space diversity is obtained) may be used, as the transmission antenna 52.

For example, an antenna configured to change the antenna characteristics by changing resonance order may be used as the transmission antenna 52.

For example, an antenna configured to change the antenna characteristics by switching between a state in which a metal piece is connected to the antenna and a state in which no metal piece is connected to the antenna may be used, as the transmission antenna 52.

For example, an antenna configured to change the antenna characteristics by switching elements or polarizations (polarization diversity is obtained) may be used, as the transmission antenna 52.

For example, an antenna configured to change the antenna characteristics by changing beamforming by using an array antenna may be used, as the transmission antenna 52.

For example, an antenna configured to change the antenna characteristics by changing a decoupling state (a state in which the antenna characteristic is changed when impedance changes) may be used, as the transmission antenna 52.

[Configuration Related to Sensor]

For the sensors of the sensor unit 76 in the wireless terminal device 12, various sensors may be used. In general, there is a plurality of types of sensors, and examples of the types of sensors include a geomagnetic sensor that detects geomagnetism, an acceleration sensor that detects acceleration, an atmospheric pressure sensor that detects atmospheric pressure, and an optical sensor that detects light, and the like.

In the present embodiment, the sensor detects a change in the surrounding environment occurring during a period from the time at which the uplink data signal is transmitted from the wireless terminal device 12 to the base station device 31 to the time of the next transmission. The change in the surrounding environment occurs, for example, due to movement of the wireless terminal device 12, a change in weather, or the like and in this case, there is a high possibility that a radio wave propagation characteristic changes at the same time.

Therefore, in the present embodiment, in the wireless terminal device 12, the control circuit 74 controls the radiation characteristic of the transmission antenna 52, on the basis of the sensor detection value information.

Note that the processing of detecting the value of a detection target by each sensor normally has lower power consumption than the processing of attempting to transmit the uplink data signal by setting one antenna characteristic to the transmission antenna 52. Therefore, the power consumption is usually smaller in the processing of determining the antenna characteristic of the transmission antenna 52 on the basis of a value detected by the sensor than in the processing of attempting to transmit the uplink data signal by switching the antenna characteristics of the transmission antenna 52.

In one example, in the wireless terminal device 12, the sensor unit 76 may include a geomagnetic sensor to detect the movement of the wireless terminal device 12 on the basis of the geomagnetism detected by the geomagnetic sensor.

Specifically, geomagnetism is generally oriented in one direction. Furthermore, in an environment in which metal materials are present in the periphery, such as in a building of reinforced concrete, a magnetic field due to geomagnetism is non-uniform. Therefore, geomagnetism is non-uniform inside the building of reinforced concrete, or the like.

Therefore, the wireless terminal device 12 having a variation in the magnetic field due to the surrounding geomagnetism suggests a possibility of movement of the wireless terminal device 12.

For example, in the wireless terminal device 12, it can be determined that the wireless terminal device 12 has moved, when the geomagnetism detected by the geomagnetism sensor has changed by an amount of change exceeding a predetermined threshold, in the sensor unit 76 or the control circuit 74. Furthermore, in the wireless terminal device 12, the sensor unit 76 or the control circuit 74 is configured to detect the position or moving distance of the wireless terminal device 12 on the basis of a geomagnetic map, when the geomagnetic map in the building where the wireless terminal device 12 is provided is allowed to be used.

In general, the power consumption of the geomagnetic sensor is extremely small, and thus, it is very suitable for the wireless terminal device 12 and the like for IoT.

In one example, in the wireless terminal device 12, the sensor unit 76 may include an atmospheric pressure sensor to detect a change in weather or the movement of the wireless terminal device 12 on the basis of the atmospheric pressure detected by the atmospheric pressure sensor.

Specifically, in the wireless terminal device 12, a change in weather or the movement of the wireless terminal device 12 can be detected on the basis of a value detected by the atmospheric pressure sensor, in the sensor unit 76 or the control circuit 74. Here, when the weather changes, the radio wave propagation characteristic may change. For example, rain scattering of radio waves due to rain or a change in reflection characteristic due to wetting of a building affects the propagation characteristic. In addition, a change in atmospheric pressure can also be considered as a result of a change in altitude of the wireless terminal device 12, and thus, when the atmospheric pressure changes in the wireless terminal device 12, it can also be considered that the propagation characteristics have changed due to the movement of the wireless terminal device 12.

Note that, for example, the change in the weather and the movement of the wireless terminal device 12 may be determined without distinction therebetween or may distinguish, for determination, the change in the weather from the movement of the wireless terminal device 12 by using another sensor or the like.

In one example, in the wireless terminal device 12, the sensor unit 76 may include an acceleration sensor to detect the movement of the wireless terminal device 12 on the basis of the acceleration detected by the acceleration sensor.

Specifically, in the wireless terminal device 12, when the acceleration detected by the acceleration sensor included in the wireless terminal device 12 is not 0, it can be determined that the wireless terminal device 12 is moving, in the sensor unit 76 or the control circuit 74. Furthermore, in the wireless terminal device 12, the direction of the movement on the basis of the direction of the acceleration can be detected, in the sensor unit 76 or the control circuit 74.

In such a configuration, for example, in a case of using an application with which the movement of the wireless terminal device 12 might be frequently caused, the movement of the wireless terminal device 12 can be reliably detected.

Furthermore, in the wireless terminal device 12, a result of integrating the acceleration and the elapsed time can be estimated as a movement amount, in the sensor unit 76 or the control circuit 74, and when the estimated movement amount is smaller than a predetermined threshold, it can be considered that the wireless terminal device 12 is not moving. In this configuration, in the wireless terminal device 12, for example, the antenna characteristic setting information previously used and stored in the memory 75 may be used without change, in the control circuit 74.

Note that, in the wireless terminal device 12, it can be considered that a change in propagation characteristic is large when the wireless terminal device 12 has a large movement amount, in the sensor unit 76 or the control circuit 74.

Timing in the wireless terminal device 12, that is, timing at which the uplink data is transmitted to the base station device 31 and timing at which detection (sensing) is performed by the sensor of the sensor unit 76 will be described.

When there is the uplink data to be transmitted, the wireless terminal device 12 determines the setting value of the antenna characteristic of the transmission antenna 52 on the basis of, for example, one or both of the sensor detection value information and the antenna characteristic setting information that is stored in the memory 75, sets the determined setting value of the antenna characteristic, and transmits the uplink data signal including the data of the setting value of the antenna characteristic to the base station device 31.

Here, the timing at which the wireless terminal device 12 transmits the uplink data to the base station device 31 may be any timing, and may be, for example, timing at regular time intervals.

In one example, in the wireless terminal device 12, the control circuit 74 may periodically wake up from the sleep state, determine the antenna characteristic with reference to the sensor detection value information detected by the sensor at that time, set the determined antenna characteristic, and transmit the uplink data to the base station device 31. In this configuration, for example, the sensor may operate, after the control circuit 74 of the wireless terminal device 12 wakes up, or may continue to operate continuously or intermittently to perform detection, even in the sleep state of the control circuit 74.

For example, in the wireless terminal device 12, when the value detected by the sensor exceeds a predetermined threshold (an example of a second threshold) during the sleep state of the control circuit 74, the control circuit 74 may transitions from the sleep state to the activation state. In this configuration, for example, when the value detected by the sensor exceeds the predetermined threshold, a predetermined signal is output from the sensor to a predetermined terminal of the control circuit 74, and thereby the control circuit 74 transitions from the sleep state to the activation state when the signal is input to the terminal. Note that instead of the processing of determining the transition from the sleep state to the activation state when the value detected by the sensor exceeds the predetermined threshold, processing of determining the transition from the sleep state to the activation state when the value detected by the sensor is less than the predetermined threshold may be used.

The timing of transmitting the uplink data to the base station device 31 in the wireless terminal device 12 may be, for example, timing at which the sensor detects a situation where the surrounding environment has changed beyond a predetermined degree when the control circuit 74 is in the sleep state after finishing transmission processing in the wireless terminal device 12. In this case, in the wireless terminal device 12, the control circuit 74 wakes up when such a situation is detected, and performs control to transmit the uplink data to the base station device 31.

Note that, in the present embodiment, the predetermined circuit (the sleep target circuit) that transitions to the sleep state in the wireless terminal device 12 is described, but in another configuration example, the wireless terminal device 12 may not include a circuit that transitions to the sleep state so that all circuits are activated at all times.

[Multipath Propagation]

Multipath propagation will be described.

The radio waves directly reach the other party, and reach the other party after being reflected, scattered, and diffracted by a building or the like. Therefore, a combined signal of these radio waves reaches the other party. Signals have amplitudes and phases, thereby the combining is vector synthesis, and for example, the magnitude of the combined signal is intensified or weakened. In addition, the vectors of these scattered waves differ depending on the frequency, and thus, the magnitude of the composite wave often has a frequency characteristic.

In other words, when the directly reached signal and the reflected, scattered, and diffracted signals are numbered, the i-th (i represents an integer of 1 or more) signal xi(t) at time t is expressed as formula (1).

In the formula (1), ωc represents a carrier frequency of the signal, τi represents a propagation time from the wireless terminal device 12 to the other party in communication, θi represents a phase, and Ai represents an amplitude. Ai, θi, and τi are determined depending on the surrounding environment, and may also change depending on the frequency.

(Mathematical Formula 1)

$$xi(t)=Ai\ \exp[j\{\omega c(t-\tau i)\}+\theta i] \tag{1}$$

The signal y(t) reaching the other party in communication is the combined signal of these signals, and thus, the signal y(t) is expressed as formula (2). In other words, y(t) represents a result of the synthesis of vectors xi(t).

In the formula (2), Σ represents a sum of i=1 to i=N. Here, there are N (N represents an integer of 1 or more and is, for example, a value of 2 or more) signals reaching the other party in communication and the respective signals are numbered from 1 to N.

(Mathematical Formula 2)

$$y(t)=\Sigma xi(t) \tag{2}$$

[Configuration Related to Memory]

The memory 75 may be, for example, a non-volatile memory (NVM) or a static random access memory (SRAM) as a volatile memory.

In a case where the memory 75 is the non-volatile memory, the wireless terminal device 12 can transition to a deep sleep state as the sleep state, with drastically reduced power consumption, and therefore, this configuration is suitable for, for example, an application having an extremely low communication frequency.

On the other hand, in a case where the memory 75 is the volatile memory, the wireless terminal device 12 cannot turn off the power of the memory 75 but can reduce a time required from waking up to restoration of the communication line, and therefore, this configuration is suitable for, for example, an application requiring quick timing.

[Setting of Antenna Characteristic Setting Information Based on Application Target to which Wireless Terminal Device is Applied]

In the wireless terminal device 12, a plurality of different types of antenna characteristic setting information may be stored in the memory 75 in advance. Then, in the wireless terminal device 12, the control circuit 74 may switchably use initial antenna characteristic setting information, according to the type of a target to which the wireless terminal device 12 is applied.

Specifically, in a case where the first antenna characteristic setting information is suitable for a smart meter and the second antenna characteristic setting information is suitable for a predetermined medical device, these two types of antenna characteristic setting information may be stored in the memory 75 of the wireless terminal device 12 in advance. Then, in a case where the wireless terminal device 12 is applied to the smart meter, the control circuit 74 performs setting so that the first antenna characteristic setting information suitable for the smart meter is used initially, according to an operation performed by the user in the wireless terminal device 12 or an instruction transmitted from any device such as the base station device 31 to the wireless terminal device 12. Likewise, in a case where the wireless terminal device 12 is applied to the predetermined medical device, the control circuit 74 performs setting so that the second antenna characteristic setting information suitable for the predetermined medical device is used initially, according to an operation performed by the user in the wireless terminal device 12 or an instruction transmitted from any device such as the base station device 31 to the wireless terminal device 12.

[Example of Configurations and Effects in Embodiment]

As described above, in the information communication system 1 according to the present embodiment, the wireless terminal device 12 is configured to wirelessly transmit a signal to the base station device 31 via the transmission antenna 52, and change the antenna characteristic control mode (e.g., the antenna characteristic setting information in the present embodiment) of the transmission antenna 52, on the basis of a reception state of the Ack signal wirelessly transmitted from the base station device 31.

Therefore, in the wireless terminal device 12 according to the present embodiment, it is possible to perform control so that the antenna characteristic control mode suitable for the quality of the uplink communication to the base station device 31 will be used.

Furthermore, in the information communication system 1 according to the present embodiment, the wireless terminal device 12 is configured to retransmit the signal including the same data, when no Ack signal is received. Then, in the wireless terminal device 12, the antenna characteristic control mode of the transmission antenna 52 is changed on the basis of the number of times of transmission of the signal performed before the Ack signal is received.

Therefore, in the wireless terminal device 12 according to the present embodiment, it is possible to perform control so that the antenna characteristic control mode suitable for the quality of the uplink communication estimated on the basis of the reception state of the Ack signal will be used.

In the information communication system 1 according to the present embodiment, the wireless terminal device 12 is configured to perform processing of storing the antenna characteristic control mode in the memory 75 and processing of reading and using the antenna characteristic control mode stored in the memory 75.

Therefore, in the wireless terminal device 12 according to the present embodiment, for example, a suitable antenna characteristic control mode can be stored, and thereafter, the same antenna characteristic control mode can be used.

Furthermore, in the information communication system 1 according to the present embodiment, the wireless terminal device 12 is configured to change the antenna characteristic control mode of the transmission antenna 52, on the basis of a value detected by a sensor that detects a value representing a change in environment (e.g., the surrounding environment).

Therefore, in the wireless terminal device 12 according to the present embodiment, the antenna characteristic control mode of the transmission antenna 52 can be changed according to a change in environment.

Furthermore, in the information communication system 1 according to the present embodiment, the wireless terminal device 12 is configured to change the antenna characteristic control mode of the transmission antenna 52 in a case where the value detected by the sensor satisfies a predetermined condition. The predetermined condition is a condition that the detected value exceeds the predetermined first threshold or a condition that the detected value is less than the predetermined first threshold.

Therefore, in the wireless terminal device 12 according to the present embodiment, the antenna characteristic control mode of the transmission antenna 52 can be changed when a change in environment is large.

Furthermore, in the information communication system 1 according to the present embodiment, the wireless terminal device 12 is configured to switch at least some circuits between the sleep state and the activation state. Then, in the wireless terminal device 12, a value is detected by the sensor at timing when the at least some circuits are switched from the sleep state to the activation state.

Therefore, in the wireless terminal device 12 according to the present embodiment, it is possible to detect a change in the environment at the timing at which the predetermined circuit is switched from the sleep state to the activation state.

Furthermore, in the information communication system 1 according to the present embodiment, the wireless terminal device 12 is configured to switch at least some circuits between the sleep state and the activation state. Then, in the wireless terminal device 12, in a case where the value detected by the sensor satisfies a predetermined condition when the at least some circuits are in the sleep state, the at least some circuits are switched from the sleep state to the activation state. The predetermined condition is a condition that the detected value exceeds a predetermined second threshold or a condition that the detected value is less than the predetermined second threshold.

Therefore, in the wireless terminal device 12 according to the present embodiment, in a case where the environment greatly changes when the predetermined circuit is in the sleep state, the predetermined circuit can be switched from the sleep state to the activation state.

Furthermore, in the information communication system 1 according to the present embodiment, the wireless terminal device 12 is configured so that the antenna characteristic control mode of the transmission antenna 52 represents one antenna characteristic to be set.

Therefore, in the wireless terminal device 12 according to the present embodiment, it is possible to perform control so that one antenna characteristic suitable for the quality of the uplink communication to the base station device 31 will be used.

Furthermore, in the information communication system 1 according to the present embodiment, the wireless terminal device 12 is configured so that the antenna characteristic control modes of the transmission antenna 52 represent a plurality of different antenna characteristics to be searched for.

Therefore, in the wireless terminal device 12 according to the present embodiment, it is possible to perform control so that processing based on a plurality of different antenna characteristics to be searched for will be performed according to the quality of the uplink communication to the base station device 31.

Furthermore, in the information communication system 1 according to the present embodiment, the wireless terminal device 12 is configured to perform switching so as to use all of the plurality of antenna characteristics represented by the antenna characteristic control modes of the transmission antenna 52.

Therefore, in the wireless terminal device 12 according to the present embodiment, it is possible to identify an optimal antenna characteristic by using all of the plurality of different antenna characteristics to be searched for.

Furthermore, in the information communication system 1 according to the present embodiment, the wireless terminal device 12 is configured to perform switching so as to use some of the plurality of antenna characteristics represented by the antenna characteristic control modes of the transmission antenna 52.

Therefore, in the wireless terminal device 12 according to the present embodiment, it is possible to quickly identify a suitable antenna characteristic, by using some of the plurality of different antenna characteristics to be searched for, although it is unclear whether the used antenna characteristic is optimal.

Furthermore, in the information communication system 1 according to the present embodiment, the wireless terminal device 12 is configured to switch the antenna characteristics of the transmission antenna 52, when no Ack signal is received.

Therefore, in the wireless terminal device 12 according to the present embodiment, when no Ack signal is received, it is considered that the antenna characteristic set to the transmission antenna 52 is not suitable, and the antenna characteristic can be switched to another antenna characteristic.

Furthermore, in the information communication system 1 according to the present embodiment, the wireless terminal device 12 is configured so that the antenna characteristic control mode of the transmission antenna 52 includes the search order for searching two or more different antenna characteristics.

Therefore, in the wireless terminal device 12 according to the present embodiment, the search for confirming whether each of the plurality of antenna characteristics is suitable can be performed in the search order suitable for the plurality of antenna characteristics.

Furthermore, in the information communication system 1 according to the present embodiment, the base station device 31 is configured to receive a signal wirelessly transmitted from the wireless terminal device 12, and wirelessly transmit the Ack signal for the signal to the wireless terminal device 12 when the signal is normally received.

Therefore, in the information communication system 1 according to the present embodiment, the wireless terminal device 12 can perform control so that the antenna characteristic control mode suitable for the quality of the uplink communication to the base station device 31 will be used.

[Cellular System]

In the present embodiment, the wireless terminal device 12 is applied to the Cellular IoT (CIoT). Unlike a smartphone that is used as a representative of the cellular system, such a wireless terminal device for the CIoT is generally installed together with a sensor, an actuator, or the like without human intervention in communication, and automatically performs data communication. In addition, such wireless terminal devices for the CIoT have been widely spread by being applied to various application programs for smart meters, medical devices, virtual reality (VR) or augmented reality (AR) devices, automobiles, and the like.

Here, an example of a CIoT application program supporting the CIoT, applied to a smart meter will be described.

The smart meter is a device that automatically measures an amount of power, gas, water, or the like used in each house and wirelessly transmits a measurement value. These pieces of usage amount data are data that do not need to be transmitted frequently. In addition, the device of the smart meter is generally driven by a battery. Therefore, as a CIoT communication system for an application program used for such a device, a low power consumption communication system, such as Category M1 or NB-IoT has been introduced. In a wireless communication device of CIoT configured as described above, for example, only one system of an RF circuit is generally mounted, instead of a multiple input multiple output (MIMO) system in which a plurality of systems of antennas and radio frequency (RF) circuits, which is common in a smartphone, is mounted. Therefore, an omnidirectional antenna is generally used as the antenna.

Furthermore, in such a wireless communication device of CIoT, an extended discontinuous reception (eDRX) system in which a sleep time during a period of no communication is extended is adopted, in order to reduce power consumption.

In general, meter devices for power, gas, and water supply are often installed at relatively inconspicuous places, such as a backside of a building and a space between buildings. Furthermore, such meter devices are not moved after being installed. For this reason, in such meter devices, it is difficult to say that the radio wave propagation characteristic is preferable at the installation place, and change of the environment cannot be expected. In such a meter device, an unsuitable radio wave propagation environment has a low line quality for the data transmission, leading to an increase in the power consumption due to repeated retransmission and the like, a reduction in a battery life, thus, leading to increased operation cost.

For example, in a case where the wireless terminal device sleeps after communication of one piece of short and sporadic data, the direction of the antenna beam after wake-up of the wireless terminal device often cannot be determined. In this case, the wireless terminal device performs processing of adjusting the direction of the antenna beam again after the wake-up, thus, leading to no reduction in power consumption.

An antenna for CIoT, supporting the Category M1 or NB-IoT, is omnidirectional, and it is difficult to improve the propagation environment.

Note that, in the communication device in which only one system of the RF circuit is mounted, a diversity method can be considered as a method of improving a transmission characteristic. In the diversity method, the antenna characteristics are switched while observing the quality of a received signal, and thus, a reception diversity effect can be obtained.

For example, in a case where a time division duplex (TDD) system is used for transmission, the same frequency is used for the uplink and the downlink. Therefore, it is expected that an antenna having high downlink transmission quality also has high uplink transmission quality. However, when a frequency division duplex (FDD) system is used, different frequencies are used for the uplink and the downlink. Therefore, even if an antenna with high downlink transmission quality is used, it cannot be said that the uplink transmission quality is always high. For this reason, the diversity method has been usually used only for reception.

For example, in IoT wireless communication that is expected to be widely introduced in recent years, a transmission quality of a channel deteriorates, in some cases.

In a use case, the wireless terminal device for the IoT may not be moved after once installed, and thus, in this case, there is no opportunity to improve the propagation environment even if the wireless terminal device is in a bad radio wave propagation environment. Here, in the wireless terminal device for the IoT has the omnidirectional antenna, and the line quality in the multipath propagation cannot be improved.

Note that, in the wireless terminal device for the IoT, power consumption is reduced in order to extend the battery life, and only one antenna and only one reception circuit are mounted according to the standard and in the actual configuration. Therefore, in the wireless terminal device for the IoT, it is impossible to introduce a technology for the effect of improving the line quality by using a plurality of antennas and reception circuits, such as in MIMO or the like.

In a personal digital cellular system (PDC) that is a second-generation mobile communication system in Japan, there has been an example of introducing space diversity in a reception system. However, this technology has an effect in an isotropic scattering moving environment in which a delay spread is sufficiently smaller than a transmission code length, but, in the use case of the IoT wireless communication, it is difficult to say that this technology has a sufficient effect in an environment in which an arrival angle spread of a scattered wave is suppressed, an environment in which a delay spread cannot be ignored, or a fixed environment.

A beamforming antenna is expected to be useful for improving the line quality of the wireless terminal device for the IoT. However, in order to improve the quality of reception, it is considered to control the directivity of the antenna, but an optimal setting value relating to reception is not always applied to that in transmission. In particular, in a case where FDD is used, the frequencies of a transmission signal and a reception signal are different, and the optimum setting values therefore are different in general. In the cellular system, the FDD system is widely adopted, and a characteristic of an uplink channel and a characteristic of a downlink channel are different.

Furthermore, in the LTE, a base station device does not notify a wireless terminal device of a signal directly evaluating the quality of an uplink signal.

The IoT wireless communication often has very few transmission opportunities. Furthermore, the IoT wireless communication often requires long sleep time to extend the battery life. Therefore, in the IoT wireless communication, it is undesirable to take a long wake-up time for control, in a situation where there are very few opportunities to control the beamforming antenna. This is because the long wake-up time leads to a reduction in the battery life.

The wireless terminal device for the IoT does not have a function of directly obtaining the transmission quality of the uplink signal. However, the wireless terminal device for the IoT can have a function of indirectly obtaining the transmission quality of the uplink signal, on the basis of the Ack signal/Nack signal notified from the base station device to the wireless terminal device. In other words, the wireless terminal device for the IoT is allowed to use a function of repeating the transmission of the same data until receiving the Ack signal.

Note that, in a case where the omnidirectional antenna is adopted in the wireless terminal device, there is no method of improving the propagation characteristic of the omnidirectional antenna, and success in the transmission is merely stochastically enhanced by retransmitting the same data.

[Application Target Other than Cellular System]

Here, in the present embodiment, the example of the information communication system 1 including the base station device 31 and the wireless terminal device 12 in the cellular system has been described, but a terminal device similar to the wireless terminal device 12 according to the present embodiment may be applied to various systems.

For example, in a case where such a terminal device is applied to a wireless local area network (LAN) system, a communication partner device of the terminal device may be an access point device.

For example, in a case where such a terminal device is applied to a Bluetooth (registered trademark) system, the communication partner device of the terminal device may be another terminal device.

As described above, the terminal device and the communication partner device thereof may have a master-slave relationship or an equal relationship in communication.

Configuration Examples (1)

An information communication device comprising:
 a transmission unit that wirelessly transmits a signal including data to a communication partner device via a transmission antenna;
 a reception unit that receives, via a reception antenna, an Ack signal wirelessly transmitted from the communication partner device; and
 a control unit that changes an antenna characteristic control mode of the transmission antenna, based on a reception state of the Ack signal received by the reception unit.

(2)

The information communication device according to (1), wherein
 the control unit retransmits the signal including the data by the transmission unit, in a case where the Ack signal is not received by the reception unit when the transmission unit wirelessly transmits the signal to the communication partner device via the transmission antenna, and
 the control unit changes the antenna characteristic control mode of the transmission antenna, based on the number of times of transmission of the signal including the data, performed by the reception unit before the Ack signal is received.

(3)

The information communication device according to (1) or (2), further comprising a memory that stores the antenna characteristic control mode, wherein the control unit performs processing of causing the memory to store the antenna characteristic control mode and processing of reading and using the antenna characteristic control mode stored in the memory.

(4)

The information communication device according to any one of (1) to (3), further comprising a sensor that detects a value representing a change in environment, wherein the control unit changes the antenna characteristic control mode of the transmission antenna, based on the value detected by the sensor.

(5)

The information communication device according to (4), wherein the control unit changes the antenna characteristic control mode of the transmission antenna, when the value detected by the sensor satisfies a predetermined condition.

(6)

The information communication device according to (4) or (5), wherein at least some of circuits are switched between a sleep state and an activation state, and the value is detected by the sensor at timing at which the at least some of circuits are switched from the sleep state to the activation state.

(7)

The information communication device according to (4) or (5), wherein at least some of circuits are switched between a sleep state and activation state, and when the value detected by the sensor satisfies a predetermined condition, while the at least some of circuits are in the sleep state, the at least some of circuits switch from the sleep state to the activation state.

(8)

The information communication device according to any one of (1) to (7), wherein the antenna characteristic control mode of the transmission antenna represents one antenna characteristic to be set.

(9)

The information communication device according to any one of (1) to (7), wherein the antenna characteristic control mode of the transmission antenna represents a plurality of different antenna characteristics.

(10)

The information communication device according to (9), wherein the control unit performs switching to use all of the plurality of the antenna characteristics represented by the antenna characteristic control mode of the transmission antenna.

(11)

The information communication device according to (9), wherein the control unit performs switching to use some of the plurality of the antenna characteristics represented by the antenna characteristic control mode of the transmission antenna.

(12)

The information communication device according to any one of (9) to (11), wherein the control unit switches the antenna characteristics of the transmission antenna when the Ack signal is not received by the reception unit.

(13)

The information communication device according to any one of (9) to (12), wherein the antenna characteristic control mode of the transmission antenna includes an order of switching two or more different antenna characteristics.

(14)

The information communication device according to any one of (1) to (13), wherein the transmission antenna and the reception antenna share an antenna.

(15)

An information communication system, comprising a first information communication device and a second information communication device, wherein the first information communication device includes:

a transmission unit that wirelessly transmits a signal including data to the second information communication device by a transmission antenna;

a reception unit that receives an Ack signal wirelessly transmitted from the second information communication device by a reception antenna; and a control unit that changes an antenna characteristic control mode of the transmission antenna based on a reception state of the Ack signal received by the reception unit, and the second information communication device includes:

a communication unit that receives the signal wirelessly transmitted from the first information communication device and wirelessly transmits the Ack signal for the received signal to the first information communication device.

About Above Embodiments

Note that a program for implementing the function of any component unit in any device described above may be recorded in a computer-readable recording medium, and the program may be read and executed by a computer system. Note that the "computer system" described herein includes hardware such as an operating system (OS) or a peripheral device. Furthermore, the "computer-readable recording medium" represents a portable medium such as a flexible disk, a magnetooptical disk, a ROM, and a compact disc (CD)-ROM, and a storage device such as a hard disk built in the computer system. Furthermore, the "computer-readable recording medium" also includes a device that holds a program for a certain period of time, such as a volatile memory (RAM) inside the computer system that serves as a server or client used when the program is transmitted via a network, such as the Internet, or a communication line, such as a phone line.

In addition, the program described above may be transmitted, from the computer system in which the program is stored in a storage device or the like, to another computer system, via a transmission medium or by a transmission wave in the transmission medium. Here, the "transmission medium" transmitting the program represents a medium having a function of transmitting information, for example, a network such as the Internet or a communication line such as a phone line.

In addition, the above program may be a program for implementing some of the functions described above. Furthermore, the above program may be so-called difference file that is implemented by combining the above function with a program having been stored in the computer system. The difference file may be referred to as a difference program.

The function of any component unit in any device described above may be implemented by a processor. For example, each type of processing in the present embodiment may be implemented by the processor that operates on the basis of information such as a program, and a computer-readable recording medium that stores the information such as the program. Here, in the processor, for example, the function of each unit may be implemented by individual hardware components, or the functions of the respective units may be implemented by integrated hardware component. For example, the processor includes hardware, and the hardware may include at least one of a circuit processing a digital signal and a circuit processing an analog signal. For example, the processor may include one or more circuit devices mounted on a circuit board, or may include one or both of one or more circuit elements. As the circuit devices, an integrated circuit (IC) and the like may be used, and as the circuit elements, a resistor, a capacitor, and the like may be used.

Here, the processor may be, for example, a CPU. However, the processor is not limited to the CPU, and various processors such as a graphics processing unit (GPU) and a digital signal processor (DSP) may be used for the processor, for example. Furthermore, the processor may be, for example, a hardware circuit including an application specific integrated circuit (ASIC). Furthermore, the processor may include, for example, a plurality of CPUs, or may include a hardware circuit including a plurality of ASICs. Furthermore, the processor may include, for example, a combination of the plurality of CPUs and the hardware circuit including the plurality of ASICs. Furthermore, the processor may include, for example, one or more of an amplifier circuit, a filter circuit, and the like that process the analog signal.

The embodiments of the present disclosure have been described in detail with reference to the drawings, but the specific configuration is not limited to the embodiments, and includes a design and the like without departing from the gist of the present disclosure, as well.

Note that the effects described herein are merely examples, and the present invention is not limited to these effects and may have other effects.

REFERENCE SIGNS LIST

1 INFORMATION COMMUNICATION SYSTEM
11 BASE STATION SIDE DEVICE
12 WIRELESS TERMINAL DEVICE
31 BASE STATION DEVICE
32 Ack/Nack DETERMINATION CIRCUIT
51 TRANSMISSION CIRCUIT
52 TRANSMISSION ANTENNA
71 RECEPTION ANTENNA
72 RECEPTION CIRCUIT
73 Ack/Nack RECEPTION CIRCUIT
74 CONTROL CIRCUIT
75 MEMORY
76 SENSOR UNIT
111 to 113 UPLINK DATA SIGNAL
131 Ack/Nack SIGNAL
151 and 152 ANTENNA CHARACTERISTIC

The invention claimed is:

1. An information communication device, comprising:
circuitry configured to:
transmit, via a transmission antenna, a first signal including data to a communication partner device, wherein
the first signal is transmitted using a first antenna characteristic of a plurality of different antenna characteristics of the transmission antenna, and
the plurality of different antenna characteristics is represented by an antenna characteristic control mode of the transmission antenna;
receive, via a reception antenna, a second signal, wherein the second signal is wirelessly transmitted from the communication partner device;
determine a reception state of the received second signal, wherein the reception state indicates one of an acknowledgement signal or a negative acknowledgement signal; and
change the antenna characteristic control mode of the transmission antenna, based on the determination that the reception state of the second signal indicates the negative acknowledgement signal, wherein
the change of the antenna characteristic control mode includes switch, from the first antenna characteristic to a second antenna characteristic of the plurality of different antenna characteristics, and
the switch from the first antenna characteristic to the second antenna characteristic is based on: a number of times of retransmission by the second antenna characteristic before the acknowledgement signal is received.

2. The information communication device according to claim 1, further comprising a memory, wherein
the circuitry is further configured to:
cause the memory to store the antenna characteristic control mode; and
read and use the antenna characteristic control mode stored in the memory.

3. The information communication device according to claim 1, further comprising a sensor configured to detect a value that represents a change in a surrounding environment of the information communication device, wherein
the circuitry is further configured to change, based on the detected value, the antenna characteristic control mode of the transmission antenna.

4. The information communication device according to claim 3, wherein the circuitry is further configured to:
determine that the value detected by the sensor satisfies a condition; and
change, based on the determination that the value detected by the sensor satisfies the condition, the antenna characteristic control mode of the transmission antenna.

5. The information communication device according to claim 3, wherein
the circuitry includes at least one circuit,
the circuitry is further configured to switch the at least one circuit between a sleep state and an activation state, and
the value is detected by the sensor at a time at which the at least one circuit is switched from the sleep state to the activation state.

6. The information communication device according to claim 3, wherein
the circuitry includes at least one circuit, and
the circuitry is further configured to:
determine, while the at least one circuit is in a sleep state, that the value detected by the sensor satisfies a condition; and
switch, based on the determination that the value detected by the sensor satisfies the condition, the at least one circuit from the sleep state to an activation state.

7. The information communication device according to claim 1, wherein
the circuitry is further configured to switch between all of the plurality of different antenna characteristics.

8. The information communication device according to claim 1, wherein the circuitry is further configured to switch between a set of antenna characteristics of the plurality of different antenna characteristics.

9. The information communication device according to claim 1, wherein
the transmission antenna and the reception antenna share an antenna.

10. An information communication system, comprising:
a first information communication device and a second information communication device, wherein
the first information communication device includes first circuitry configured to:
transmit, via a transmission antenna, a first signal including data to the second information communication device, wherein
the first signal is transmitted using a first antenna characteristic of a plurality of different antenna characteristics, and
the plurality of different antenna characteristics is represented by an antenna characteristic control mode of the transmission antenna;
receive, via a reception antenna, a second signal, wherein the second signal is wirelessly transmitted from the second information communication device;
determine a reception state of the received second signal, wherein the reception state indicates one of an acknowledgement signal or a negative acknowledgement signal; and
change the antenna characteristic control mode of the transmission antenna based on the determination that the reception state of the second signal indicates the negative acknowledgement signal, wherein
the change of the antenna characteristic control mode includes switch, from the first antenna characteristic to a second antenna characteristic of the plurality of different antenna characteristics, and
the switch from the first antenna characteristic to the second antenna characteristic is based on: a number of times of retransmission by the second antenna characteristic before the acknowledgement signal is received, and
the second information communication device includes second circuitry configured to
receive the first signal wirelessly transmitted from the first information communication device; and
transmit the second signal for the received first signal to the first information communication device.

* * * * *